US011498511B2

(12) United States Patent
Walker et al.

(10) Patent No.: US 11,498,511 B2
(45) Date of Patent: Nov. 15, 2022

(54) AIRBAG ASSEMBLIES INCLUDING AIRBAG BODIES HAVING SEWN PORTIONS AND METHODS FOR FORMING SAME

(71) Applicant: Toyoda Gosei Co., Ltd., Kiyosu (JP)

(72) Inventors: David O. Walker, Belleville, MI (US); John Ruddy, Milford, MI (US); Brandon Streeter, Howell, MI (US)

(73) Assignee: TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 17/201,425

(22) Filed: Mar. 15, 2021

(65) Prior Publication Data
US 2022/0289133 A1    Sep. 15, 2022

(51) Int. Cl.
*B60R 21/2334* (2011.01)
*B60R 21/235* (2006.01)

(52) U.S. Cl.
CPC ........ *B60R 21/2334* (2013.01); *B60R 21/235* (2013.01); *B60R 2021/23538* (2013.01)

(58) Field of Classification Search
CPC .................................................. B60R 21/231
See application file for complete search history.

(56) References Cited

U.S. PATENT DOCUMENTS

| 8,393,636 | B2 | 3/2013 | Tanaka et al. |
| 8,505,969 | B2 | 8/2013 | Mendez |
| 8,696,020 | B2 * | 4/2014 | Tanaka .................. B60R 21/233 |
| | | | 280/743.1 |
| 9,469,270 | B2 * | 10/2016 | Abe ...................... B60R 21/206 |
| 9,821,750 | B2 * | 11/2017 | Miura .................. B60R 21/237 |
| 9,902,361 | B2 * | 2/2018 | Lee ..................... B60R 21/2338 |
| 10,086,788 | B2 * | 10/2018 | Ando .................... B60R 21/231 |
| 2005/0062265 | A1 | 3/2005 | Hotta et al. |
| 2012/0025498 | A1 | 2/2012 | Tanaka |

FOREIGN PATENT DOCUMENTS

WO     WO-2013139415 A1 *   9/2013    ........... B60R 21/231

* cited by examiner

*Primary Examiner* — Nicole T Verley
(74) *Attorney, Agent, or Firm* — Dinsmore & Shohl LLP

(57) ABSTRACT

An airbag assembly including an airbag body having a front side and an opposite rear side, a fold line provided on one of the front side and the rear side, the fold line configured to adjust a length of the one of the front side and the rear side such that a length of the rear side is greater than a length of the front side when the airbag body is in a deployed state, the fold line defining a lower boundary, and a sewn portion provided on an outer surface portion of the front side and an outer surface portion of the rear side. The sewn portion fixes an inner surface portion of the front side to an inner surface portion of the rear side at a location within a predetermined distance from the lower boundary.

20 Claims, 5 Drawing Sheets

AIRBAG ASSEMBLIES INCLUDING AIRBAG BODIES HAVING SEWN PORTIONS AND METHODS FOR FORMING SAME

TECHNICAL FIELD

The present specification generally relates to vehicle airbags and, more specifically, airbag assemblies having sewn portions that control an angle of deployment and methods of forming vehicle airbags for controlling an angle of deployment.

BACKGROUND

Conventional vehicle airbags are provided at various locations of a vehicle to protect passengers in the vehicle during a collision from multiple directions. Thus, these airbags are specifically manufactured to deploy at a particular angle or direction based on the location at which the airbag is inflating within the vehicle. To control the angle or direction of deployment of the airbag, one or more tethers may be provided within an interior of the airbag. The tethers extend from one or side of the airbag to an opposite side of the airbag to control the shape at which the airbag inflates.

However, installing these tethers requires access to the interior of the airbag. Thus, the tethers must be installed while the airbag is still in an unassembled state. As a result, this increases the manufacturing time required to form the airbag.

Accordingly, a need exists for improved airbag assemblies that control an angle of deployment without requiring access to an interior thereof.

SUMMARY

In one embodiment, an airbag assembly includes an airbag body having a front side and an opposite rear side, a fold line provided on one of the front side and the rear side, the fold line configured to adjust a length of the one of the front side and the rear side such that a length of the rear side is greater than a length of the front side when the airbag body is in a deployed state, the fold line defining a lower boundary, and a sewn portion provided on an outer surface portion of the front side and an outer surface portion of the rear side, the sewn portion fixing an inner surface portion of the front side to an inner surface portion of the rear side at a location within a predetermined distance from the lower boundary.

In another embodiment, a vehicle includes an airbag assembly including an airbag body having a front side and an opposite rear side, a fold line provided on one of the front side and the rear side, the fold line configured to adjust a length of the one of the front side and the rear side such that a length of the rear side is greater than a length of the front side when the airbag body is in a deployed state, the fold line defining a lower boundary, and a sewn portion provided on an outer surface portion of the front side and an outer surface portion of the rear side, the sewn portion fixing an inner surface portion of the front side to an inner surface portion of the rear side at a location within a predetermined distance from the lower boundary.

In yet another embodiment, a method includes forming an airbag assembly including an airbag body having a front side and an opposite rear side, forming a fold line on one of the front side and the rear side, the fold line configured to adjust a length of the one of the front side and the rear side such that a length of the rear side is greater than a length of the front side when the airbag body is in a deployed state, the fold line defining a lower boundary, and fixing, at a sewn portion provided on each of an outer surface portion of the front side and an outer surface portion of the rear side, an inner surface portion of the front side to an inner surface portion the rear side at a location within a predetermined distance from the lower boundary.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
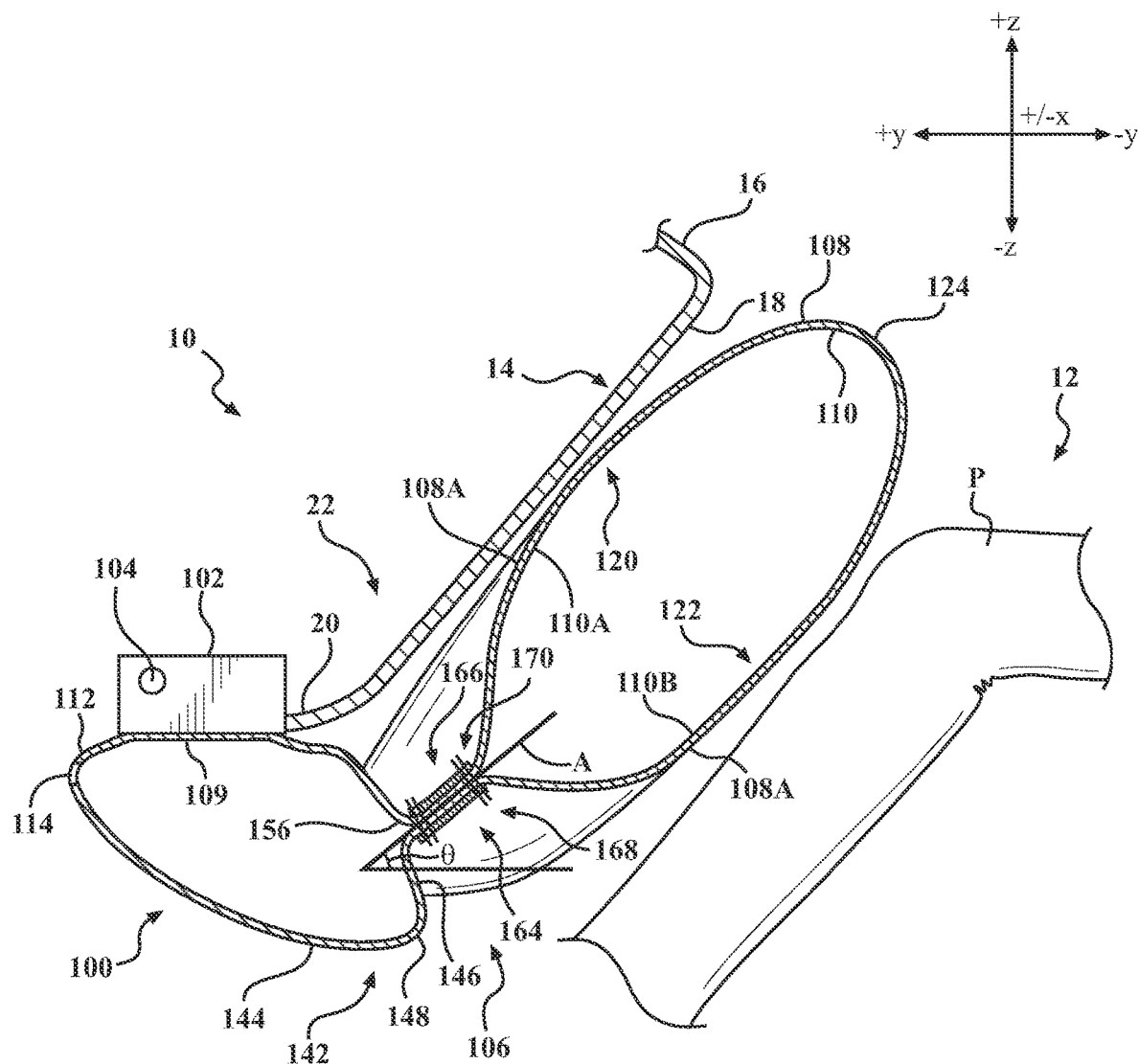
FIG. 1 schematically depicts a cross-sectional view of an embodiment of an airbag assembly including an airbag body in a deployed state, according to one or more embodiments shown and described herein.

An embodiment of an airbag assembly for restraining a passenger during a vehicle collision is depicted in FIG. 1 and generally includes an airbag body having a front side and an opposite rear side, and a sewn portion provided on an outer surface of each of the front side and a rear side. The sewn portion fixes the front side to the rear side and is located within a predetermined distance of a lower boundary defined by a fold line provided on one of the front side and the rear side of the airbag body. The airbag is operable to inflate the airbag body between an undeployed state and a deployed state in which the airbag body is housed within an airbag housing when in the undeployed state. The fold line is configured to adjust a length of the front side or the rear side such that a length of the rear side is greater than a length of the front side when the airbag body is in a deployed state. Various embodiments of the airbag assemblies, operation of the airbag assemblies, and methods of manufacturing the airbag assemblies are described in more detail herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/−vehicle X direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring now to FIG. 1, a partial view of a vehicle 10 is shown generally including a passenger compartment 12 provided in an interior thereof. The passenger compartment 12 is a portion of an interior of the vehicle 10 which passengers or other occupants occupy. A plurality of vehicle seats, not shown, including a driver seat, front passenger seat, and one or more rear passenger seats may be provided within the passenger compartment 12 of the vehicle 10. A lower dashboard 14 extends across the vehicle 10 in a vehicle lateral direction in front of the driver seat and the front passenger seat.

The lower dashboard 14 includes an upper wall 16 extending toward an instrument panel of the vehicle 10 and a side wall 18 extending downward and at an angle in the vehicle forward direction from the upper wall 16. Although not shown, the lower dashboard 14 may include a door providing access to a glove compartment formed therein. The side wall 18 extends in front of the legs, specifically the knees and shins, of the driver and the front passenger when seated in the driver seat and the front passenger seat, respectively. As shown, the side wall 18 extends in front of the legs of a front passenger P seated in a front passenger seat.

The lower dashboard 14 also includes a lower wall 20 extending from the side wall 18 of the lower dashboard 14. A cavity 22 is provided within the lower dashboard 14, at least at the lower wall 20 for receiving an airbag assembly 100. Specifically, an airbag housing 102 of the airbag assembly 100 is provided within the cavity 22. The lower dashboard 14 may include a rupturable door, not shown, formed in the lower wall 20 to contain the airbag assembly 100 within the lower dashboard 14 until deployed. Thus, the rupturable door is configured to permit the deployment of an airbag body 106 of the airbag assembly 100 when the vehicle 10 senses, determines, or predicts a collision.

Referring still to FIG. 1, the airbag assembly 100 includes the airbag housing 102, an inflator 104, and the airbag body 106 in fluid communication with the inflator 104. As shown in FIG. 1, the airbag body 106 inflated by the inflator 104 and extending outside of the airbag housing 102 and the lower dashboard 14 such that the airbag body 106 of the airbag assembly 100 is in the deployed state.

The airbag body 106 is formed from a thin, nylon fabric and folded within the airbag housing 102 when in a folded state. In some embodiments, the inflator 104 is electrically connected to a collision sensor, not shown. The collision sensor determines or predicts an occurrence of a collision when a specific condition is satisfied. The collision sensor then actuates the inflator 104. In some embodiments, the collision sensor is electrically connected to an electronic control unit (ECU), not shown, of the vehicle 10 or a separate airbag electronic control unit (airbag ECU) acting as an intermediary between the collision sensor and the airbag assembly 100, specifically, the inflator 104. In this instance, the collision sensor sends data to the ECU or the airbag ECU which makes a determination as to whether the inflator 104 should be actuated.

When the collision sensor, the ECU, or the airbag ECU determines the airbag body 106 should inflate, the inflator 104 provides a gaseous reaction resulting in the production of nitrogen or other gases. Such reactions include, but are not limited to, sodium azide ($NaN_3$) reacting with potassium nitrate ($KNO_3$) to produce nitrogen gas. The nitrogen gas released from the inflator 104 is directed into the airbag body 106 to inflate the airbag body 106 from the folded state to the deployed state. During the inflation towards the deployed state, a force of the airbag body 106 expanding pushes against the rupturable door in the lower dashboard 14 until it ruptures, which allows the airbag body 106 to expand outside of the lower dashboard 14 and in front of the passenger P seated in the driver seat or the front passenger seat of the vehicle 10.

Although the airbag assembly 100 is discussed herein as being stowed within the lower dashboard 14 of the vehicle 10 and inflating in front of a driver seat or a front passenger seat of the vehicle 10 to function as a knee airbag, this is not intended to be limiting to the present disclosure. Accordingly, in embodiments, the airbag assembly 100 may be provided within an instrument panel or a steering wheel of the vehicle 10 as a front airbag, within a seat of the vehicle 10 as a side airbag, within a door of the vehicle 10 as a curtain airbag, and the like.

Figure 2:
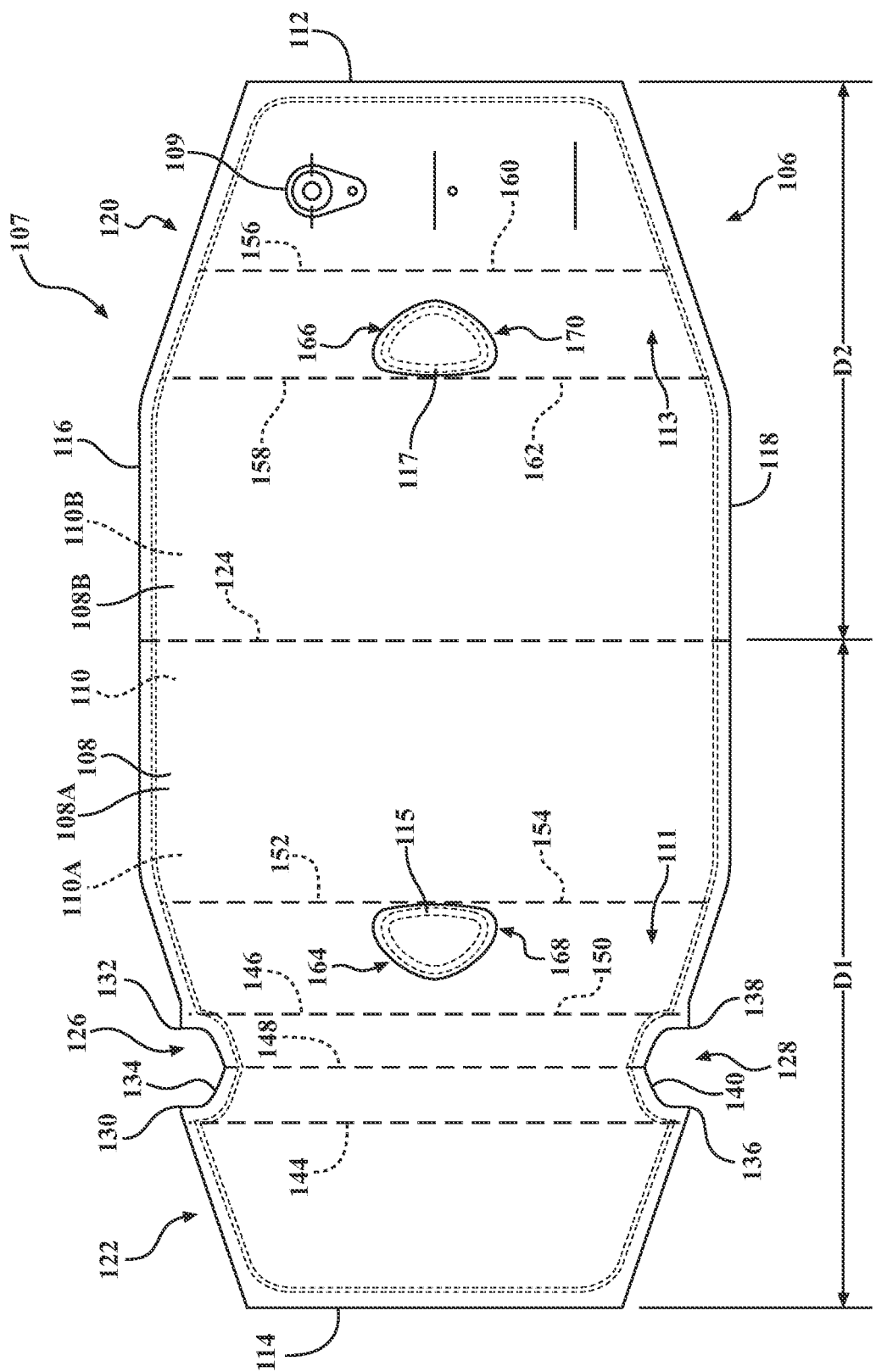
FIG. 2 schematically depicts a plan view of the airbag body in an unassembled state, according to one or more embodiments shown and described herein.

Referring now to FIG. 2, a plan view of an embodiment of an airbag panel 107 forming the airbag body 106 in an unassembled state is illustrated. It should be appreciated that the airbag body 106 is formed from the airbag panel 107, formed of the nylon material, which is folded and sewn in the manner described herein to form the airbag body 106. Once the airbag panel 107 is sewn to form the airbag body 106, the airbag body 106 may be inflated to transition from the folded state into the deployed state. Accordingly, the airbag body 106 includes an outer surface 108, an opposite inner surface 110, a first end 112, an opposite second end 114, a first side edge 116, and an opposite second side edge 118. The first side edge 116 and the second side edge 118 extend between the first end 112 and the second end 114. The airbag body 106 defines a front side 120 and an opposite rear side 122 separated by a dividing line 124 extending generally normal to a longitudinal axis of the airbag panel 107. The dividing line 124 extends in a vehicle lateral direction when the airbag body 106 is in the deployed state. More particularly, the front side 120 of the airbag body 106 is defined by the first end 112, the pair of side edges 116, 118, and the dividing line 124, and the rear side 122 is defined by the second end 114, the pair of side edges 116, 118, and the dividing line 124. A distance D1 between the second end 114 and the dividing line 124 of the airbag panel 107 is greater than a distance D2 between the first end 112 and the dividing line 124 of the airbag panel 107 when the airbag body 106 is in the unassembled state. The airbag body 106 also includes a port 109 formed on the front side 120 of the airbag body 106 that communicates with the inflator 104, as discussed herein.

As shown in FIG. 1, the front side 120 is positioned closer to the lower dashboard 14 than the rear side 122 when the airbag body 106 is in the deployed state. Thus, the front side 120 faces a vehicle forward direction and the rear side 122 faces a vehicle rearward direction. More particularly, the front side 120 of the airbag body 106 faces towards the lower dashboard 14 and the rear side 122 faces towards the front passenger P.

Referring again to FIG. 2, a first cutout 126 is formed in the first side edge 116 and a second cutout 128 is formed in the second side edge 118 opposite the first cutout 126. The first cutout 126 and the second cutout 128 have a substantially concave shape such that the first cutout 126 extends inwardly toward the second side edge 118 and the second cutout 128 extends inwardly toward the first side edge 116. The first cutout 126 is defined by a first junction 130 at the first side edge 116, a second junction 132 at the first side edge 116, and a first cutout edge 134 extending between the first junction 130 and the second junction 132. Similarly, the second cutout 128 is defined by a first junction 136 at the second side edge 118, a second junction 138 at the second side edge 118, and a second cutout edge 140 extending between the first junction 136 and the second junction 138. To form the airbag body 106 from the airbag panel 107, the rear side 122 is folded along the fold line 148, and the airbag panel 107 is folded at the dividing line 124 such that the front side 120 overlaps the rear side 122 and the airbag panel 107 is sewn along an entire perimeter thereof. Specifically at the first end 112, the second end 114, the first side edge 116, the second side edge 118, the first cutout edge 134, and the second cutout edge 140. More specifically, a portion of the first cutout edge 134 extending between the fold line 148 to the first junction 130 is sewn to a portion of the first cutout edge 134 extend between the fold line 148 to the second junction 132. Similarly, a portion of the second cutout edge 140 extending between the fold line 148 to the first junction 136 is sewn to a portion of the second cutout edge 140 extending between the fold line 148 and the second junction 138.

Figure 3:
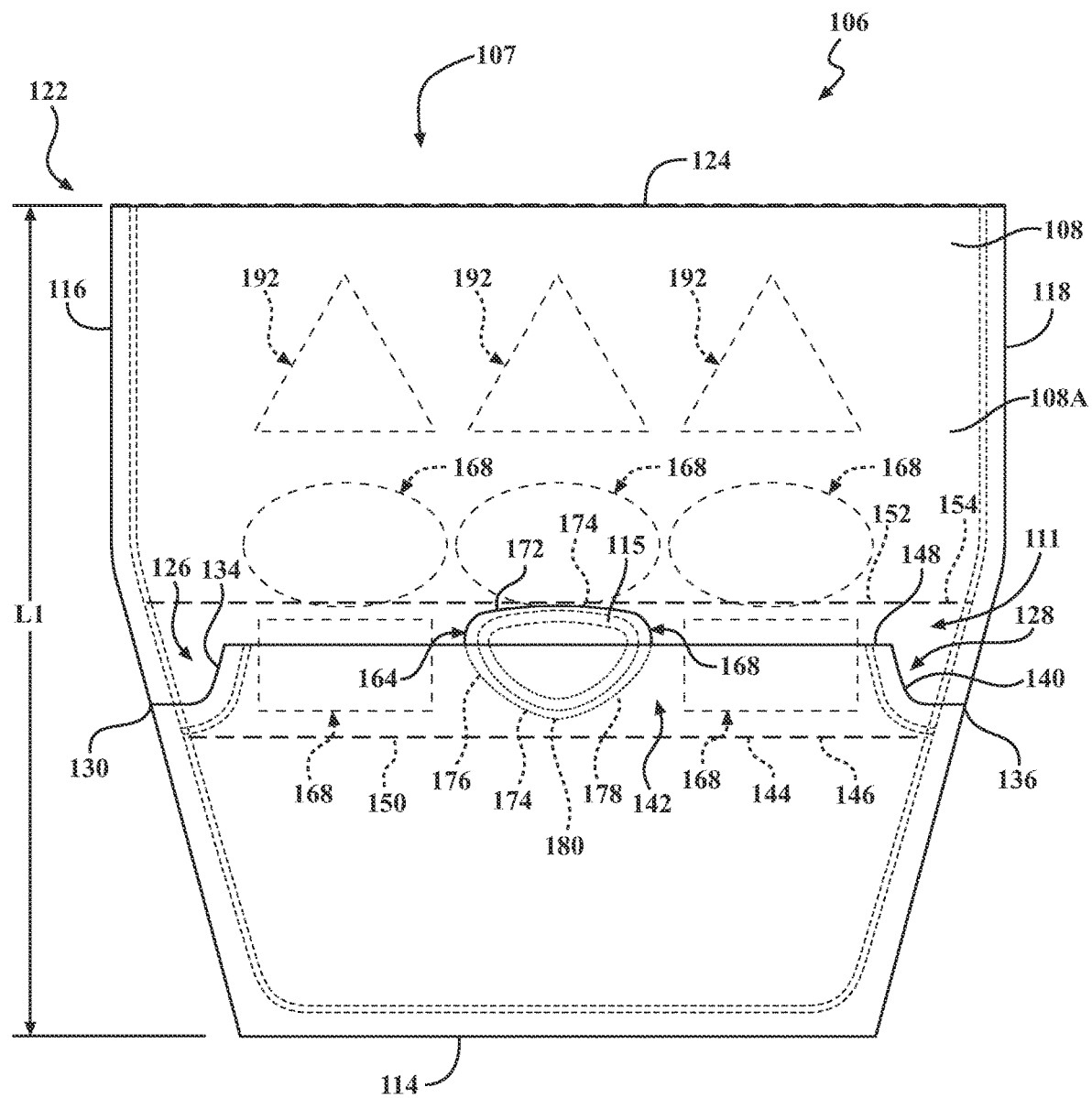
FIG. 3 schematically depicts a rear view of the airbag assembly in an assembled state, according to one or more embodiments shown and described herein.
Figure 4:
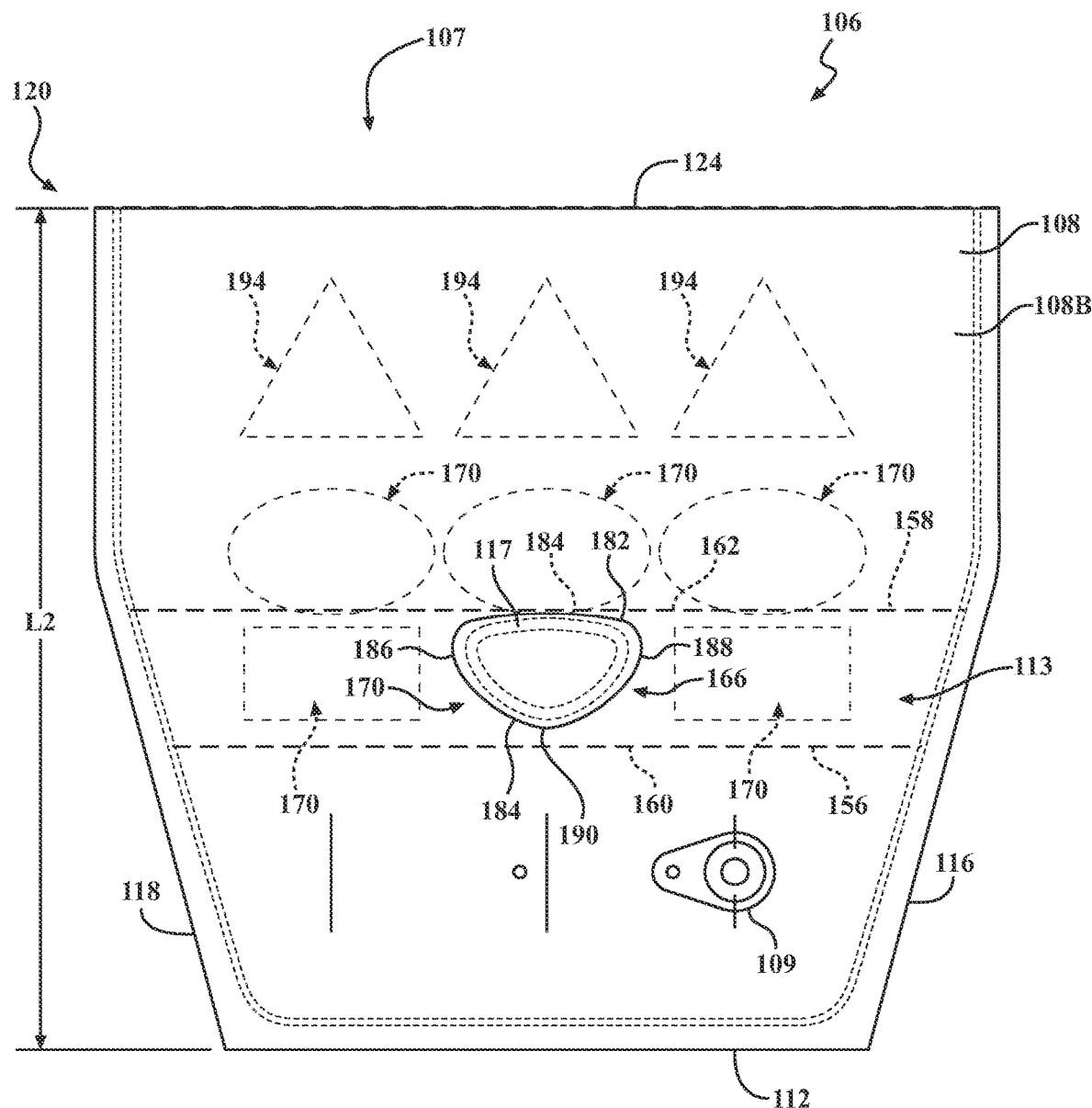
FIG. 4 schematically depicts a front view of the airbag assembly in the assembled state, according to one or more embodiments shown and described herein.

As discussed in more detail herein, the first cutout 126 and the second cutout 128 are configured to form an elbow 142 in the airbag body 106 such that, when the airbag body 106 is in an assembled state and in the undeployed state, as shown in FIGS. 3 and 4, a length L1 of the rear side 122, specifically, a length from the second end 114 to the dividing line 124, of the airbag body 106 is equal to a length L2 of the front side 120, specifically, a length from the first end 112 to the dividing line 124, of the airbag body 106. As used herein, the undeployed state refers to the airbag body 106 being in the assembled state and outside of the airbag housing 102, i.e., not in the folded state. When the airbag body 106 is in the deployed state, the length L1 of the rear side 122 of the airbag body 106 is greater than the length L2 of the front side 120 due to the elbow 142 which unfolds during deployment to control a deflection angle θ of the airbag body 106 in a vehicle upward direction and along the side wall 18 of the lower dashboard 14, as shown in FIG. 1. The deflection angle θ is defined between an axis A and a horizontal plane extending in the vehicle longitudinal direction. Also shown in FIG. 1, the port 109 of the airbag body 106 is connected and in fluid communication with the inflator 104 such that the inflator 104 is able to communicate with an inside of the airbag body 106.

As shown in FIG. 2, a first line 144 extends from the first junction 130 of the first cutout 126 and the first junction 136 of the second cutout 128, a second line 146 extends from the second junction 132 of the first cutout 126 and the second junction 138 of the second cutout 128, and a fold line 148 extends between the first cutout 126 and the second cutout 128 equidistantly between the first line 144 and the second line 146. As discussed in greater detail below, the second line 146 defines a lower boundary 150 of a predetermined zone 111 on the rear side 122 of the airbag body 106 and therefore illustrated as a single reference line.

As described herein, the rear side 122 is folded at the fold line 148, specifically, the first cutout 126 and the second cutout 128 fold at the fold line 148 when the airbag body 106 is in the assembled state to reduce the distance D1 of the rear side 122 of the airbag body 106 to the length L1 equal to the length L2 of the front side 120 of the airbag body 106. Specifically, as shown in FIG. 3 with the airbag body 106 in the assembled state and the undeployed state, the rear side 122 is folded at the fold line 148 such that the first junction 130 of the first cutout 126 overlaps the second junction 132 of the first cutout 126, and the first junction 136 of the second cutout 128 overlaps the second junction 138 of the second cutout 128.

When the airbag body 106 inflates into the deployed state, the first cutout 126 and the second cutout 128 unfold at the fold line 148 to expand the elbow 142 (FIG. 1), thereby increasing the length of the rear side 122 of the airbag body 106 to a length greater than a length of the front side 120 of the airbag body 106. As noted herein, the elbow 142 directs the airbag body 106 to inflate in a vehicle upward direction and control the deflection angle θ, as shown in FIG. 1.

Additionally, a third line 152 extends between the first side edge 116 and the second side edge 118 of the airbag body 106 on the rear side 122 thereof. The third line 152 defines an upper boundary 154 of the predetermined zone 111, and therefore illustrated as a single reference line, on the rear side 122 and is located a predetermined distance from the second line 146, i.e., the lower boundary 150, in a direction opposite the fold line 148. Thus, the predetermined zone 111 is defined between the lower boundary 150 and the upper boundary 154. In embodiments, the predetermined distance between is equal to or less than 70 millimeters (mm)±1 mm, ±2 mm, ±5 mm, or ±10 mm, from the second line 146.

With respect to the front side 120 of the airbag body 106, a fourth line 156 extends from the first side edge 116 to the second side edge 118 and a fifth line 158 extends from the first side edge 116 to the second side edge 118. When the airbag body 106 is folded about the dividing line 124, the fourth line 156 is located at a position corresponding to the second line 146 and the fifth line 158 is located at a position corresponding to the third line 152. Thus, the fourth line 156 defines a lower boundary 160 of a predetermined zone 113 on the front side 120 and the fifth line 158 defines an upper boundary 162 of the predetermined zone 113 located a predetermined distance from the lower boundary 160 on the front side 120. Thus, the predetermined zone 113 is defined between the lower boundary 160 and the upper boundary 162. The fourth line 156 and the lower boundary 160 are illustrated as a single reference line, and the fifth line 158 and the upper boundary 162 are illustrated as a single reference line. As with the lower boundary 150 and the upper boundary 154 on the rear side 122, the upper boundary 162 on the front side 120 is located at the same predetermined distance from the lower boundary 160 on the front side 120. It should be appreciated that the lines discussed herein are, in embodiments, imaginary or reference lines. In other embodiments, one or more of the lines are physical seams sewn into the airbag body 106.

Referring still to FIG. 2, a rear sewn portion 164 and a front sewn portion 166 are provided on the outer surface 108 of the airbag body 106. Specifically, the rear sewn portion 164 is provided on an outer surface portion 108A of the outer surface 108 on the rear side 122, and the front sewn portion 166 is provided on an outer surface portion 108B of the outer surface 108 on the front side 120. As described in more detail herein, the rear sewn portion 164 and the front sewn portion 166 are configured to fix the rear side 122 to the front side 120 of the airbag body 106 at a location between the lower boundaries 150, 160 and the upper boundaries 154, 162. More particularly, the rear sewn portion 164 and the front sewn portion 166 fix an inner surface portion 110A of the inner surface 110 on the rear side 122 to an inner surface portion 110B of the inner surface 110 on the front side 120. The rear sewn portion 164 and the front sewn portion 166 may be fixed to one another in any suitable manner such as, for example, sewing at seams 115, 117 or the like. As shown, the rear sewn portion 164 includes a rear patch 168 located at least partially between the lower boundary 150 and the upper boundary 154 of the rear side 122 of the airbag body 106, and the front sewn portion 166 includes a front patch 170 located at least partially between the lower boundary 160 and the upper boundary 162 on the front side 120 of the airbag body 106.

Referring now to FIG. 3, a rear view of the rear side 122 of the airbag body 106 is illustrated with the first cutout 126 and the second cutout 128 folded about the fold line 148. As shown, in embodiments, the rear patch 168 is positioned entirely between the lower boundary 150 and the upper boundary 154. A portion of the rear patch 168 is shown in dashed lines as the rear patch 168 is partially hidden by the elbow 142. It should be appreciated that any number of rear patches 168 may be provided between the lower boundary 150 and the upper boundary 154.

As shown, in embodiments, three rear patches 168 are provided between the lower boundary 150 and the upper boundary 154 and are spaced apart from one another in a direction extending between the first side edge 116 and the second side edge 118. In addition, the rear patch 168 may have any suitable shape such as, for example, circular, elliptical, rectangular, triangular, and the like. In embodiments, one of the rear patches 168, shown in solid lines, has a substantially triangular shape. More particularly, the rear patch 168 has an upper edge 172, an opposite lower edge 174, and a pair of tapered side edges 176, 178 extending between the upper edge 172 and the lower edge 174. Thus, a distance between the side edges 176, 178 at the upper edge 172 is greater than a distance between the side edges 176, 178 at the lower edge 174. The lower edge 174 defines a vertex 180 located closer to the lower boundary 150 compared to a distance between the upper edge 172 and the lower boundary 150. In embodiments, at least the vertex 180 of the one or more rear patches 168 is located within the predetermined zone 111, i.e., between the lower boundary 150 and the upper boundary 154. In embodiments, the vertex 180 may be located on the upper boundary 154.

Referring to FIG. 4, a front view of the front side 120 of the airbag body 106 is illustrated. As with the one or more rear patches 168 on the rear side 122 of the airbag body 106, in embodiments, one or more front patches 170 may be provided entirely between the lower boundary 160 and the upper boundary 162 with each of the one or more front patches 170 corresponding to a position of each of the one or more rear patches 168. Each front patch 170 is fixed, e.g., sewn, to an opposite rear patch 168. The one or more front patches 170 also have a shape corresponding to each of the one or more rear patches 168. Thus, one of the front patches 170, shown in solid lines, has an upper edge 182, an opposite lower edge 184, and a pair of tapered side edges 186, 188 extending between the upper edge 182 and the lower edge 184 to define a substantially triangular shape. Thus, a distance between the side edges 186, 188 at the upper edge 182 is greater than a distance between the side edges 186, 188 at the lower edge 184. The lower edge 184 defines a vertex 190 located closer to the lower boundary 160 compared to a distance between the upper edge 182 and the lower boundary 160. In embodiments, at least the vertex 190 of the one or more front patches 170 is located within the predetermined zone 113, i.e., between the lower boundary 160 and the upper boundary 162. In embodiments, the vertex 190 may be located on the upper boundary 162.

It should be appreciated that the position of the one or more rear patches 168 and the one or more front patches 170 relative to the lower boundaries 150, 160 affects the deflection angle $\theta$ at which the airbag body 106 extends when in the deployed state, as shown in FIG. 1. For example, with the one or more rear patches 168 and the one or more front patches 170 positioned entirely between the lower boundaries 150, 160 and the upper boundaries 154, 162, the deflection angle $\theta$ may be from about 40 degrees to about 90 degrees. In addition, it should be appreciated that the one or more rear patches 168, i.e., the sewn portions 164, and the one or more patches 170, i.e., the sewn portions 166, increases the gas flow to the dividing line 124 so as to decrease the deployment time in which the airbag body 106 transitions from the folded state to the deployed state.

Referring to FIGS. 3 and 4, in embodiments, the one or more rear patches 168 and the one or more front patches 170 may be positioned closer to the dividing line 124. As a non-limiting example, one or more rear patches 168, shown in phantom as having an elliptical shape, may be positioned such that the lower edge 174 is still positioned within the predetermined distance of the lower boundary 150 such as, for example, between the lower boundary 150 and the upper boundary 154, or on the upper boundary 154 itself. Similarly, as shown in FIG. 4, one or more front patches 170, shown in phantom as having an elliptical shape, may be positioned such that the lower edge 184 is still positioned within the predetermined distance of the lower boundary 160 such as, for example, between the lower boundary 160 and the upper boundary 162, or on the upper boundary 162 itself. Thus, the rear side 122 and the front side 120 of the airbag body 106 are still fixed to one another at a location within the predetermined distance of the lower boundaries 150, 160.

It should be appreciated that by adjusting the position of the one or more rear patches 168 and the one or more front patches 170 closer to the dividing line 124 and away from the lower boundaries 150, 160, the deflection angle $\theta$ (FIG. 1) decreases. For example, with the lower edge 174 of the rear patch 168 and the lower edge 184 of the front patch 170 positioned closer to, or even on, the upper boundaries 154, 162, the deflection angle may be from about 20 degrees to about 60 degrees.

In embodiments, referring again to FIG. 3, one or more supplemental rear patches 192 may be provided in additional to the one or more rear patches 168. The one or more supplemental rear patches 192 are positioned closer to the dividing line 124 than the one or more rear patches 168 and, thus, positioned entirely between the upper boundary 154 and the dividing line 124. As with the one or more rear patches 168, the one or more supplemental rear patches 192 may have any suitable shape such as, for example, circular, elliptical, rectangular, triangular, and the like. In addition, any suitable number of supplemental rear patches 192 may be provided and arranged in spaced apart manner from one another. As shown, three supplemental rear patches 192 are provided between the upper boundary 154 and the dividing line 124 and are spaced apart from one another in a direction extending between the first side edge 116 and the second side edge 118.

Similarly, referring again to FIG. 4, one or more supplemental front patches 194 may be provided in additional to the one or more front patches 170 and corresponding to the position of the one or more supplemental rear patches 192. Accordingly, the one or more supplemental front patches 194 are positioned closer to the dividing line 124 than the one or more front patches 170 and, thus, positioned entirely between the upper boundary 162 and the dividing line 124. As with the one or more front patches 170, the one or more supplemental front patches 194 may have any suitable shape such as, for example, circular, elliptical, rectangular, triangular, and the like. In addition, any suitable number of supplemental front patches 194 may be provided and arranged in spaced apart manner from one another. As shown, three supplemental front patches 194 are provided between the upper boundary 162 and the dividing line 124 and are spaced apart from one another in a direction extending between the first side edge 116 and the second side edge 118.

The one or more supplemental rear patches 192 and the one or more supplemental front patches 194 may be utilized to further control a deflection shape of the airbag body 106 when in the deployed state. Specifically, the one or more supplemental rear patches 192 and the one or more supplemental front patches 194 may be utilized to adjust a deflection of the airbag body 106 at a location closer to the dividing line 124.

Figure 5:
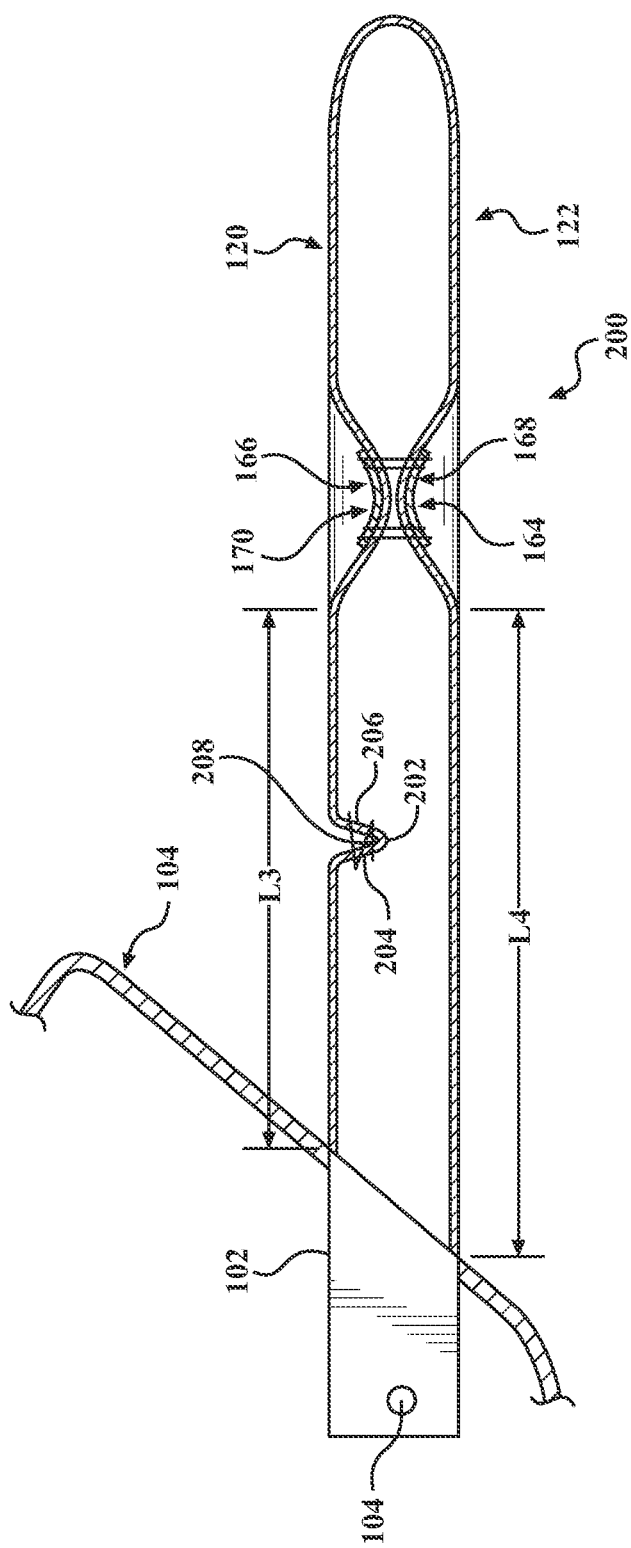
FIG. 5 schematically depicts a cross-sectional view of an alternative embodiment of an airbag body, according to one or more embodiments shown and described herein.

Referring now to FIG. 5, an alternative embodiment of the airbag body 200 is shown extending from the airbag housing 102 in the lower dashboard 14. The airbag body 200 is similar to the airbag body 106 and, thus, like structure is indicated with like reference numerals. As such, the airbag body 200 includes a front side 120, a rear side 122, a rear sewn portion 164 on the rear side 122 including a rear patch 168, and a front sewn portion 166 on the front side 120 including a front patch 170. Contrary to the embodiment of the airbag body 106 discussed herein in which the fold line 148 is provided on the rear side 122 to form the elbow 142, in the present embodiment of the airbag body 200, a fold line 202 is formed in the front side 120 of the airbag body 200. A first fold portion 204 on one side of the fold line 202 is fixed to a second fold portion 206 on an opposite side of the fold line 202 in any suitable manner such as, for example, sewing or the like, to reduce a length of the front side 120 of the airbag body 200. Thus, after the first fold portion 204 is fixed to the second fold portion 206, as shown by stitching 208, a length L3 of the front side 120 is defined between an end of the front side 120 at the airbag housing 102 and the front sewn portion 166, and a length L4 of the rear side 122 is defined between an end of the rear side 122 at the airbag housing 102 and the rear sewn portion 164. As shown, the length L4 of the rear side 122 is greater than the length L3 of the front side 120. As with the embodiments described herein and illustrated in FIG. 1, because the length L4 of the rear side 122 is greater than the length L3 of the front side 120, the airbag body 200 is configured to inflate in the vehicle upward direction when in the deployed state.

From the above, it is to be appreciated that defined herein is an airbag assembly including an airbag body having a sewn portion provided on an outer surface of each of a front side and a rear side of the airbag body. The sewn portion fixes the front side to the rear side and is located within a predetermined distance of a lower boundary defined by a fold line provided on one of the front side and the rear side of the airbag body. The sewn portion provided on the outer surface of the front side and the rear side of the airbag body permit the front side and the rear side to be fixed to one another within requiring access to an inner surface or interior of the airbag body.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An airbag assembly comprising:
   an airbag body having a front side and an opposite rear side;
   a fold line provided on one of the front side and the rear side, the fold line configured to adjust a length of the one of the front side and the rear side such that a length of the rear side is equal to a length of the front side when the airbag body is in an undeployed state, and a length of the rear side is greater than a length of the front side when the airbag body is in a deployed state, the fold line defining a lower boundary; and
   a sewn portion provided on an outer surface portion of the front side and an outer surface portion of the rear side, the sewn portion fixing an inner surface portion of the front side to an inner surface portion of the rear side at a location within a predetermined distance from the lower boundary, the sewn portion including a patch.

2. The airbag assembly of claim 1, wherein the predetermined distance from the lower boundary is equal to or less than 70 mm.

3. The airbag assembly of claim 1, wherein the patch has a pair of tapered side edges defining a substantially triangular shape.

4. The airbag assembly of claim 3, wherein the patch includes an upper edge and an opposite lower edge defining a vertex, the vertex is closer to the lower boundary compared to a distance between the upper edge and the lower boundary.

5. The airbag assembly of claim 1, wherein the patch of the sewn portion comprises:
   a front patch provided on an outer surface of the front side; and
   a rear patch provided on an outer surface of the rear side and sewn to the front patch.

6. The airbag assembly of claim 5, wherein a lower edge of the rear patch and a lower edge the front patch are each at least partially positioned within the predetermined distance of the lower boundary.

7. The airbag assembly of claim 6, wherein the rear patch and the front patch are each positioned entirely within the predetermined distance of the lower boundary.

8. The airbag assembly of claim 5, further comprising:
   a plurality of front patches provided on the outer surface of the front side at a location within the predetermined distance from the lower boundary; and
   a plurality of rear patches provided on the outer surface of the rear side at a location within the predetermined distance from the lower boundary,
   wherein the plurality of rear patches are each sewn to an opposite one of the plurality of front patches.

9. A vehicle comprising:
   an airbag assembly comprising:
     an airbag body having a front side and an opposite rear side;
     a fold line provided on one of the front side and the rear side, the fold line configured to adjust a length of the one of the front side and the rear side such that a length of the rear side is equal to a length of the front side when the airbag body is in an undeployed state, and a length of the rear side is greater than a length of the front side when the airbag body is in a deployed state, the fold line defining a lower boundary; and a sewn portion provided on an outer surface portion of the front side and an outer surface portion of the rear side, the sewn portion fixing an inner surface portion of the front side to an inner surface portion the rear side at a location within a predetermined distance from the lower boundary, the sewn portion including a patch.

10. The vehicle of claim 9, wherein the predetermined distance from the lower boundary is equal to or less than 70 mm.

11. The vehicle of claim 9, wherein the airbag assembly is a knee airbag.

12. The vehicle of claim 9, wherein the patch of the sewn portion comprises a rear patch and a front patch each having a triangular shape including an upper edge, an opposite lower edge defining a vertex, and a pair of tapered side edges extending between the upper edge and the lower edge, the vertex is closer to the lower boundary compared to a distance between the upper edge and the lower boundary.

13. The vehicle of claim 12, wherein a lower edge of the rear patch and a lower edge the front patch are each at least partially positioned within the predetermined distance of the lower boundary.

14. The vehicle of claim 13, wherein the rear patch and the front patch are each positioned entirely within the predetermined distance of the lower boundary.

15. The vehicle of claim 12, further comprising:
a plurality of front patches provided on an outer surface of the front side at a location within the predetermined distance from the lower boundary; and
a plurality of rear patches provided on an outer surface of the rear side at a location within the predetermined distance from the lower boundary,
wherein the plurality of rear patches are each sewn to an opposite one of the plurality of front patches.

16. A method comprising:
forming an airbag assembly including an airbag body having a front side and an opposite rear side;
forming a fold line on one of the front side and the rear side, the fold line configured to adjust a length of the one of the front side and the rear side such that a length of the rear side is equal to a length of the front side when the airbag body is in an undeployed state, and a length of the rear side is greater than a length of the front side when the airbag body is in a deployed state, the fold line defining a lower boundary; and
fixing, at a sewn portion provided on each of an outer surface portion of the front side and an outer surface portion of the rear side, an inner surface portion of the front side to an inner surface portion of the rear side at a location within a predetermined distance from the lower boundary, the sewn portion including a patch.

17. The method of claim 16, wherein the predetermined distance from the lower boundary is equal to or less than 70 mm.

18. The method of claim 17, further comprising positioning the sewn portion entirely within the predetermined distance from the lower boundary.

19. The method of claim 16, wherein the patch has an upper edge, an opposite lower edge defining a vertex, and a pair of tapered side edges extending between the upper edge and the lower edge, the vertex is closer to the lower boundary than the upper edge.

20. The method of claim 16, wherein fixing the front side to the rear side comprises:
sewing one or more front patches of the patch to an outer surface of the front side;
sewing one or more rear patches of the patch to an outer surface of the rear side; and
sewing the one or more rear patches to an opposite one of the one or more front patches.

* * * * *